US006757982B2

(12) United States Patent
Refson

(10) Patent No.: US 6,757,982 B2
(45) Date of Patent: Jul. 6, 2004

(54) SAFETY IMPROVEMENTS FOR POWER TOOL

(75) Inventor: Neil Refson, Aberdeen (GB)

(73) Assignee: Exakt Precision Tools Limited, Aberdeen (GB)

( * ) Notice: Subject to any disclaimer, the term of this patent is extended or adjusted under 35 U.S.C. 154(b) by 29 days.

(21) Appl. No.: 10/051,225

(22) Filed: Jan. 18, 2002

(65) Prior Publication Data

US 2003/0136011 A1 Jul. 24, 2003

(51) Int. Cl.[7] .......................... B27G 19/04; B27B 9/00; B23D 45/16

(52) U.S. Cl. .......................................... 30/391; 30/374

(58) Field of Search ................................ 30/286, 277.4, 30/276, 371, 373, 374, 376, 377, 388, 390, 391

(56) References Cited

U.S. PATENT DOCUMENTS 2,627,657 A * 2/1953 Etchen ...................... 30/277.4
4,545,121 A * 10/1985 Armbruster et al. .......... 30/374
5,477,845 A * 12/1995 Zuzelo ........................ 125/15
5,491,963 A * 2/1996 Jerez .......................... 56/17.1

FOREIGN PATENT DOCUMENTS

| | | | |
|---|---|---|---|
| DE | 32 39 986 | * | 5/1984 |
| EP | 0 993 919 A2 | * | 4/2000 |
| EP | 1 177 868 A2 | * | 2/2002 |
| JP | 53-2786 | * | 1/1978 |
| WO | WO 96/13362 | * | 5/1996 |

* cited by examiner

*Primary Examiner*—Hwei-Siu Payer
(74) *Attorney, Agent, or Firm*—Workman Nydegger

(57) ABSTRACT

A hand-held power tool includes a cutting blade within a housing (5) and a guard (10) placed over the operating head of the tool. The guard is movable in the direction (1) in order to expose the blade during cutting. The sliding mechanism is improved by maintaining alignment between the guard and the head over a larger distance. In one embodiment, this is achieved by sliders (FIG. 8) in grooves (9). Contact over a larger range reduces the likelihood of jamming and improves handle precision. Alternative embodiments provide structure for indicating the blade position (FIG. 11), and a frangible retaining washer for disengaging the cutting blade (FIGS. 13 to 15).

24 Claims, 10 Drawing Sheets

SAFETY IMPROVEMENTS FOR POWER TOOL

CROSS-REFERENCE TO RELATED APPLICATIONS

Not applicable.

BACKGROUND OF THE INVENTION

1. The Field of the Invention

The present invention relates to the field of hand-held power tools, and in particular safety aspects thereof.

2. The Relevant Technology

Hand operated power tools, of the type shown in European Patent No 0993919, EP Application No 95934753.5, and German Patent No 3239986 all have certain similarities. They each have a base plate which presses flat onto the work surface prior to and during the cutting operation. The cutting element is eased into the work piece by pressing the handle in a direction perpendicular to and towards the work surface, whilst the handle remains at a constant angle. The result is that the base plate and/or guard slides with respect to the handle.

The existing method used to achieve this sliding action is to attach two round rods onto the base plate, which are perpendicular to it. These slide in round bearings attached to the main case.

This system works well, but has the disadvantage of requiring a substantial base plate onto which the rods are mounted, in order to attain sufficient strength and rigidity. The rods also require very accurate positioning in both their location with respect to each other and their angle. If this positioning is poor the base plate will stick or wobble.

Both European Patent No 0 993 919 and European Patent Application No 95934753.5 show that increased safety is achieved if the base plate has four sides perpendicular to it, which prevent the user from coming into direct contact with the blade. These sides represent a guard which slides over or in the main case during operation. If this method is employed, an easier and cheaper method for achieving the sliding action is to attach bearing material to either the main case or the guard, and allow the other member to slide on this.

Japanese Utility Publication No 53-2786 refers to a hand-held tool whose blade may be surrounded by a protective guard housing. This housing is able to slide along one axis by means of guiding pins held within channels within this housing. However, this prior system has the disadvantage of these pins being prone to becoming jammed in the channels due to the direct contact with the inner surface of the channel. This device has only point contact within the sliding means increasing the likelihood of jamming. Poor angular location of the guard may also result from this direct, inflexible contact.

BRIEF SUMMARY OF THE INVENTION

It is one object of the present invention to provide hand operated power tools with simple but effectively located blade guard.

According to a first aspect of the present invention, there is provided a guard for use with hand operated power tools, said guard being dimensioned to fit over and around the operating head of said power tool and being a sliding fit thereon, and wherein slider bearings are mounted between the guard and said operating head of the tool, as to maintain alignment between the guard and head over the operating range of movement of the guard.

Preferably, four such slider bearings are provided spaced around the periphery of the guard.

Preferably the slider bearings comprise co-operating tongue and groove formations on the guard and operating head or vice versa.

Preferably also, the slider bearings are made of or coated with a material with a relatively low co-efficient of friction, such as PTFE, polyacetal or polyamide.

Preferably also the guard is resiliently biased towards a first position in which a cutting blade of the tool is covered.

Typically, the guard features a position indicator scale and depth adjuster to enable the depth of the guard to be set to a known value.

Optionally, indication markings are also provided to show the chord length of the blade.

European patent applications numbers EP 99307894.4 and EP 95934753.5 show a method of indicating the chord length of exposed cutting blade by using an arc marked on the main body, which intersects with vertical lines marked on the movable guard. The chord length will vary depending on the setting of the depth adjuster, which limits the movement of the guard and thus the amount of exposed cutting blade. Having indication is useful when cutting out as is shows where the cut starts and finishes.

With this form of indication the chord length of exposed cutting blade, for any given depth, cannot be seen until the guard has been retracted as far as the depth adjuster will allow. That is, it is only possible to determine the foremost and/or rearmost portions of the cutting blade when the blade is fully extended. Therefore, in the prior art, it is difficult for an operator to use the indication for positioning the tool, prior to cutting. This is a problem when cutting out because the tool should only be fed in a forwards direction, whilst cutting, and requires positioning exactly at the start of the cut.

It would be desirable to have a means for indicating the position at which the blade will begin cutting before the tool is depressed and the blade is exposed.

According to a second aspect of the present invention, there is provided a guard for use with hand operated power tools, said guard being dimensioned to fit over and around the operating head of said power tool and being a sliding fit thereon, said guard being movable relative to said tool between a first position in which a cutting blade of the tool is covered, and a second position in which the cutting blade is exposed, wherein the guard is provided with indication marks for indicating to the user the foremost point at which the cutting blade protrudes from the guard when in both first and second positions.

The guard may be provided with a depth adjuster for controlling the maximum extension of the cutting blade from the guard base. The depth adjuster is preferably provided with an indicator scale to enable the depth of the guard to be set to a known value.

The indication markings on the guard may correspond directly to the indicator scale on the depth adjuster.

The indication markings preferably indicate the rearmost point at which the cutting blade protrudes.

A further drawback of hand operated electric circular saws and disk cutters of the prior art is that they can be prone to blade jamming which can occur if the cutting blade strikes a harder object than it is intended to cut, if the bade is twisted in the cut or if the tool is fed in the reverse direction. Blade jamming can cause damage to both the tool and the operator by loss of control.

According to a third aspect of the invention there is provided a hand operated power tool comprising a rotary cutting blade, a driving shaft, and a retaining washer, said cutting blade being urged towards the driving shaft by said retaining washer so that the blade and shaft rotate together, wherein the retaining washer is frangible and substantial restriction of the rotation of the cutting blade causes the retaining washer to break, thereby releasing the blade from being urged towards the driving shaft.

The retaining washer may be attached to the driving shaft by a screw extending through a hole in the retaining washer and the cutting blade.

Preferably, a substantial restriction of the rotation of the cutting blade causes a tightening of the screw in the driving shaft, said tightening causing the retaining washer to break.

The retaining washer may comprise an outer region of a first thickness, and an inner region of a second thickness, the second thickness being less than the first thickness. Preferably a fixing screw abuts the inner region, and the outer region abuts the cutting blade.

The retaining washer may be made from a brittle material, for example die cast zinc.

BRIEF DESCRIPTION OF THE DRAWINGS

In order to provide a better understanding of the present invention, examples will now be described by way of example only with reference to the accompanying Figures in which.

DETAILED DESCRIPTION OF THE PREFERRED EMBODIMENTS

When the terms left or right are used throughout this description, it is assumed that the tool is being viewed from behind, looking along the direction of cut. Some features and hidden detail have been omitted for the sake of clarity.

A hand operated power tool is shown in FIGS. 1 to 10. The arrow 1 in FIGS. 1, 2 and 7 points vertically to show the orientation of the tool when in use.

Figure 1:
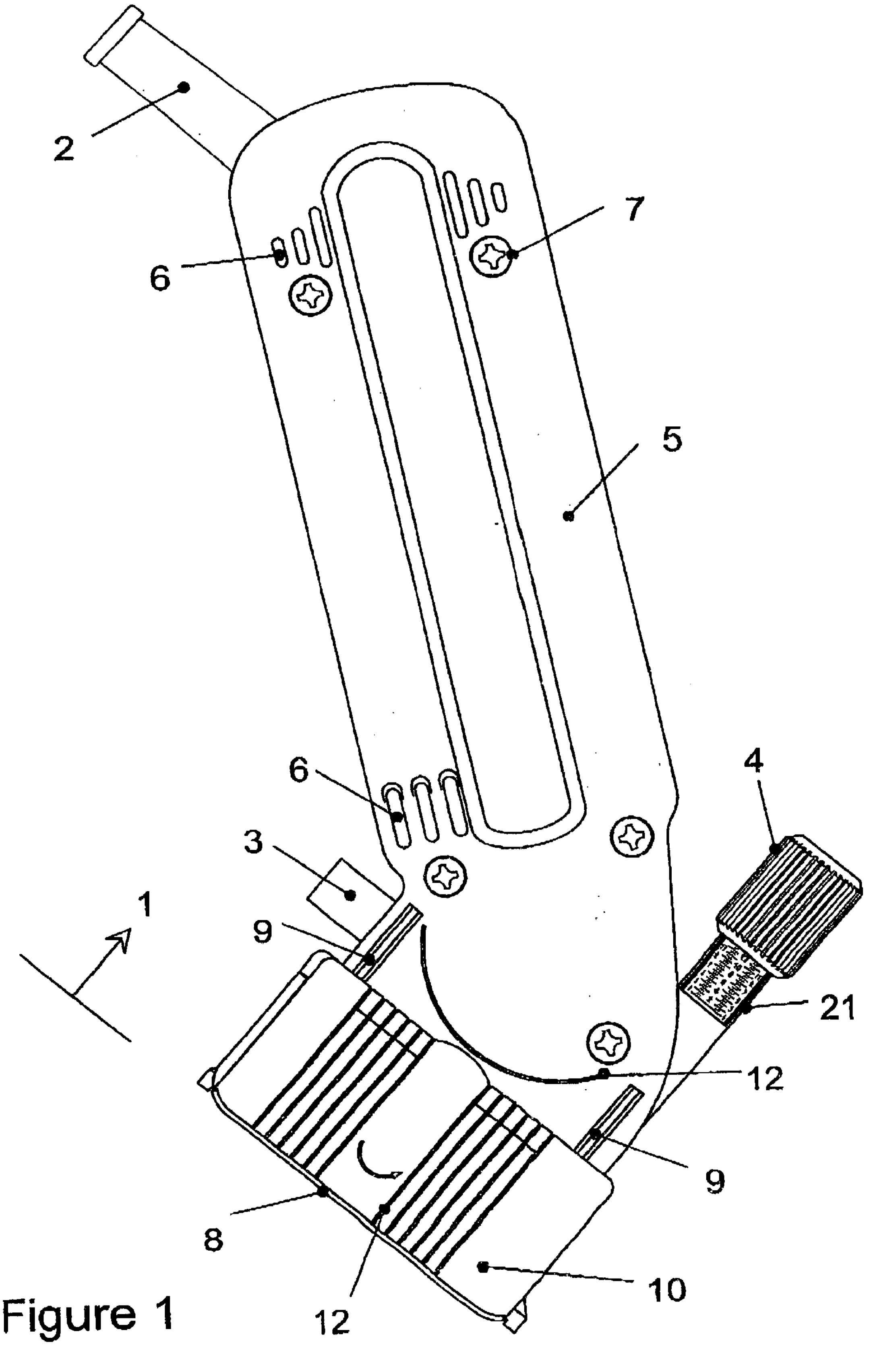
FIG. 1 shows a right hand view of the complete tool.
Figure 2:
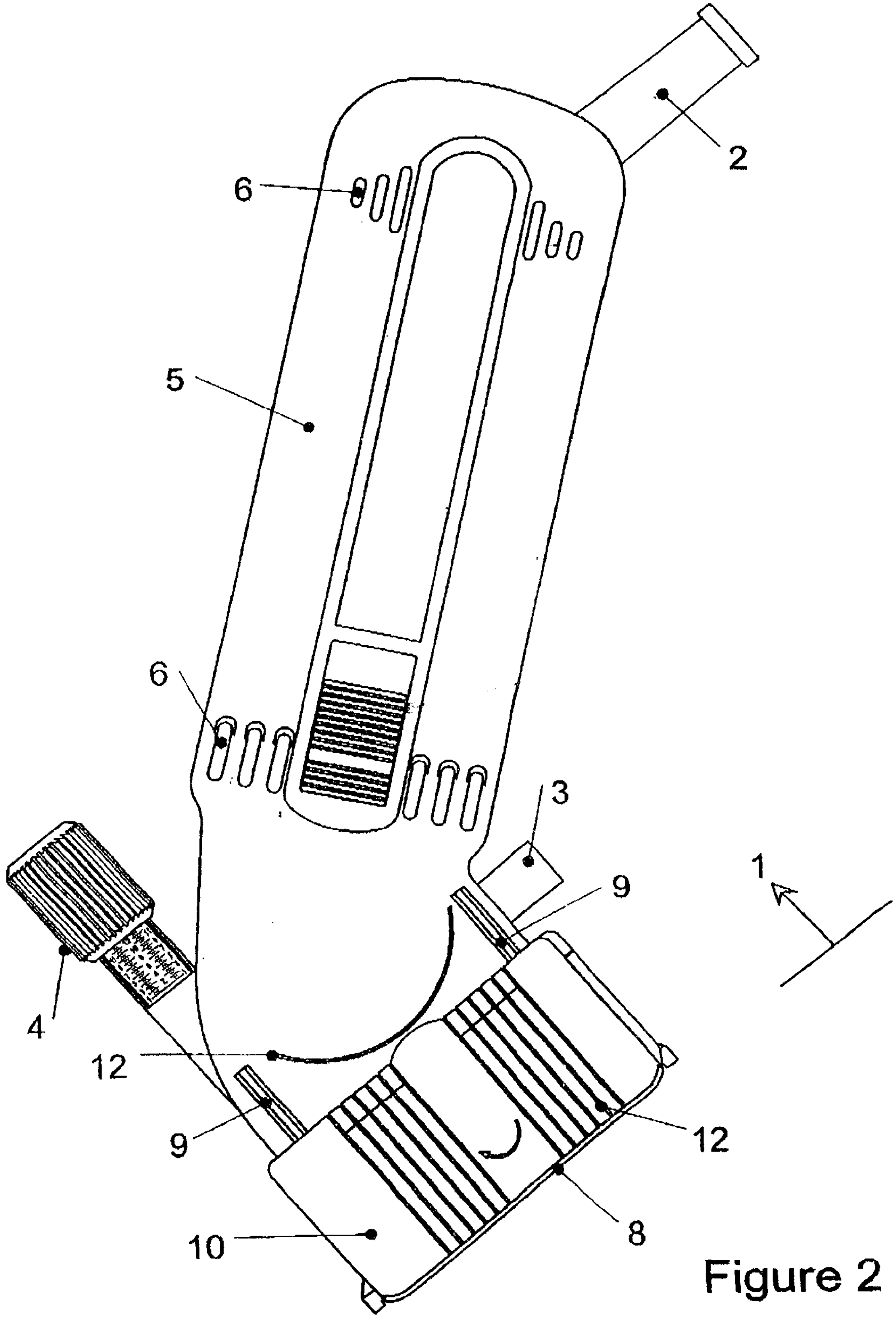
FIG. 2 shows a left hand view of the complete tool.
Figure 10:
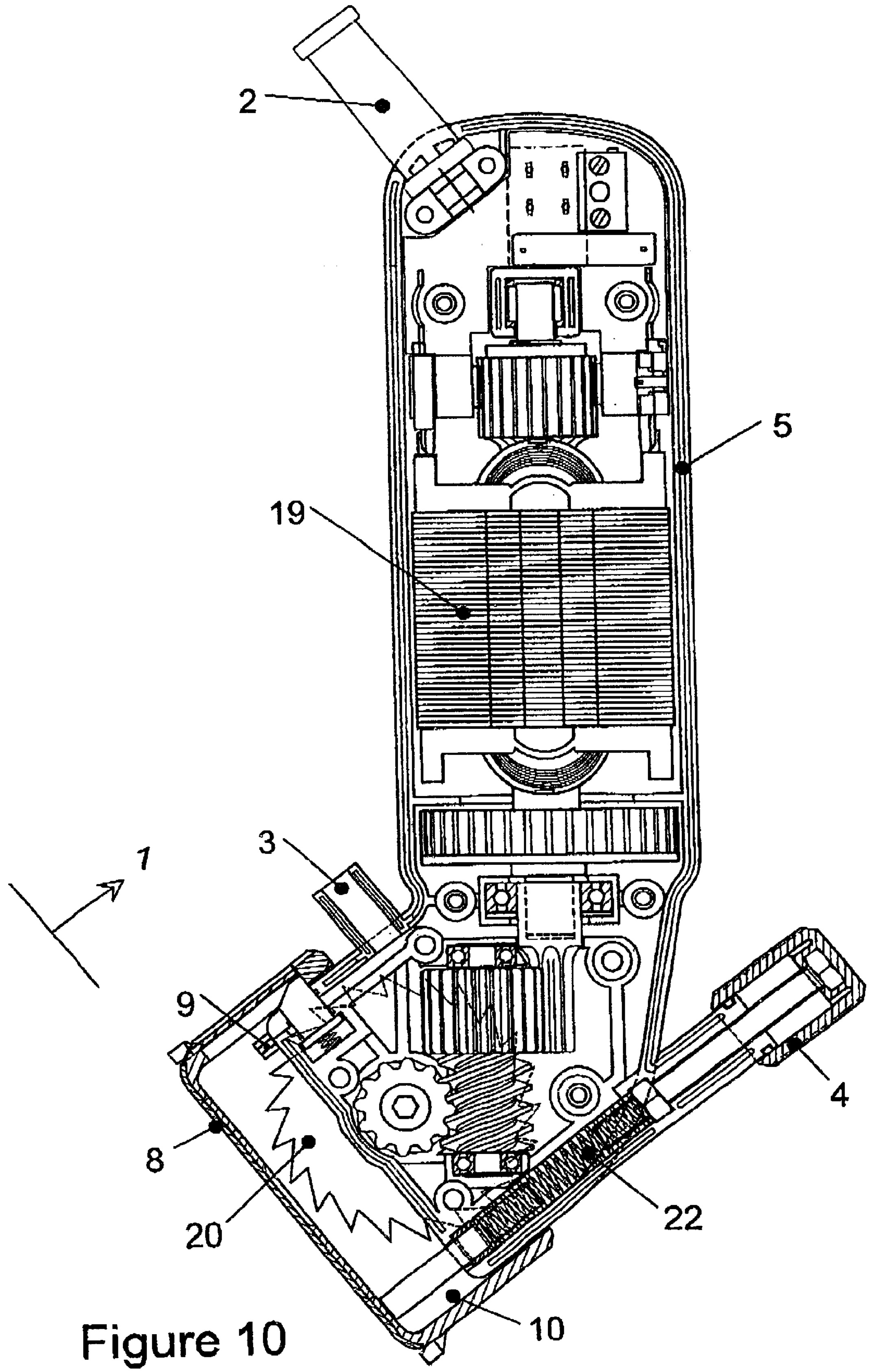
FIG. 10 shows an inside view of the tool.

In FIGS. 1 and 2, the main case 5 acts as the handle and encloses the electric motor 19 (as in FIG. 10.) The main case consists of two plastic injection moulded sides, which are fastened using screws 7. Vents 6, are provided for motor cooling. The power cable enters through strain relief 2. The waste from cutting is expelled through nozzle 3 (as in FIGS. 1, 2 and 10.)

Figure 3:
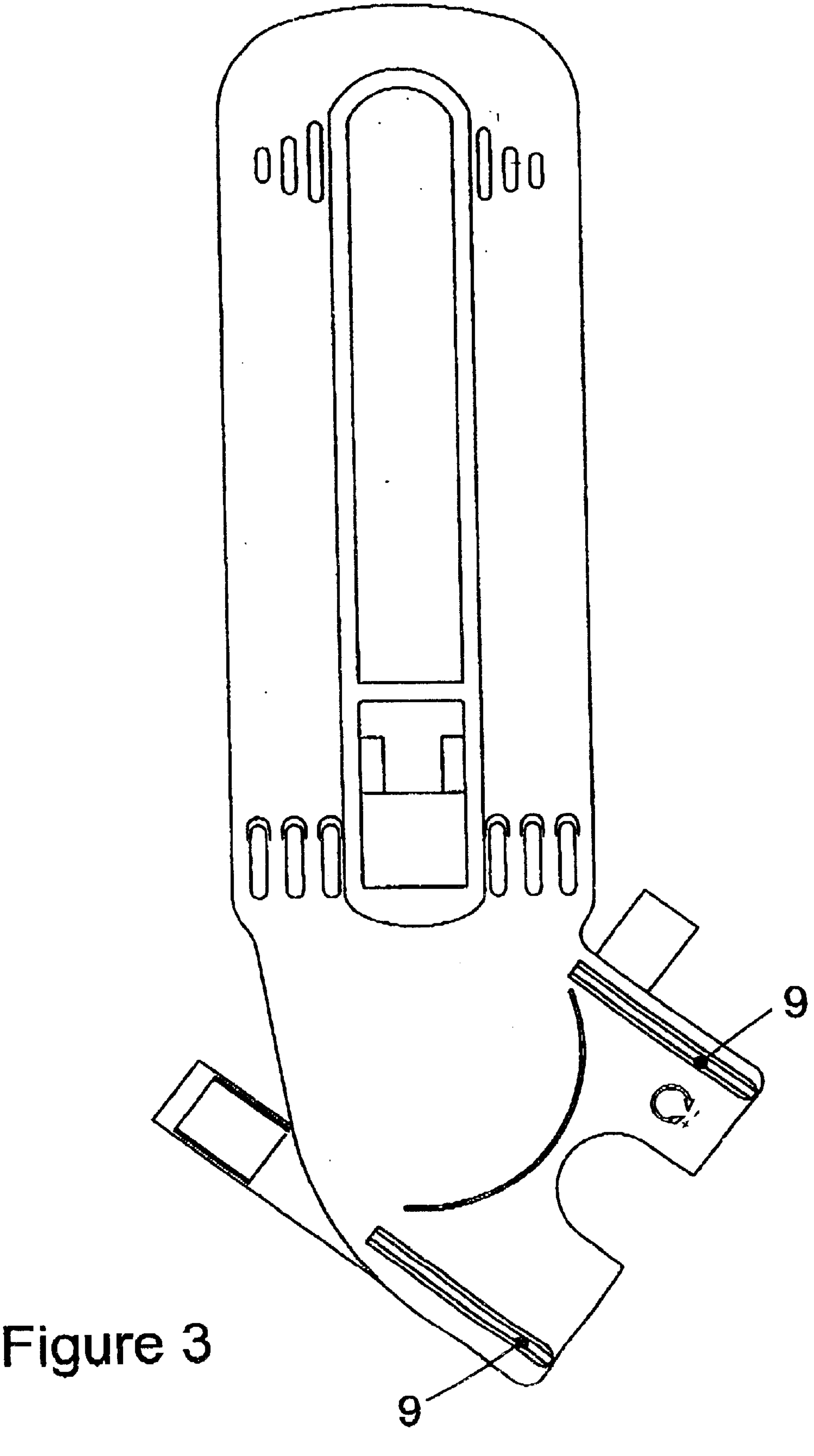
FIG. 3 shows a left hand view of the main case moulding of the tool.
Figure 5:
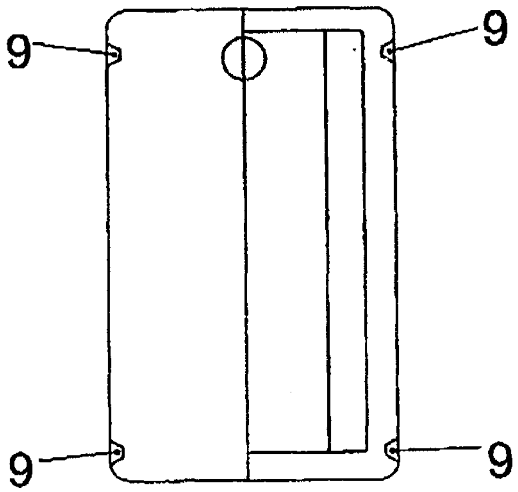
FIG. 5 shows a base view of the assembled main case of the tool.
Figure 4:
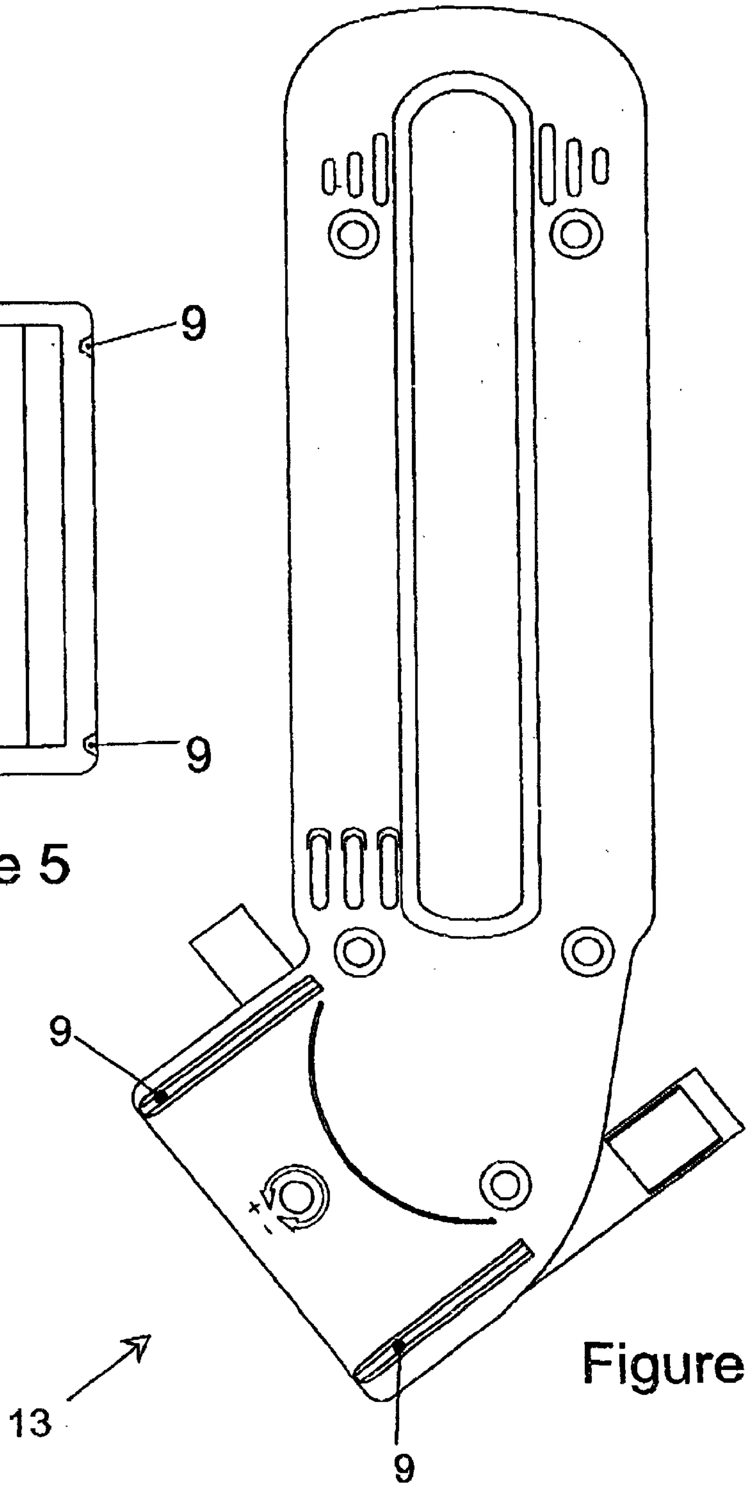
FIG. 4 shows a right hand view of the main case moulding of the tool.
Figure 6:
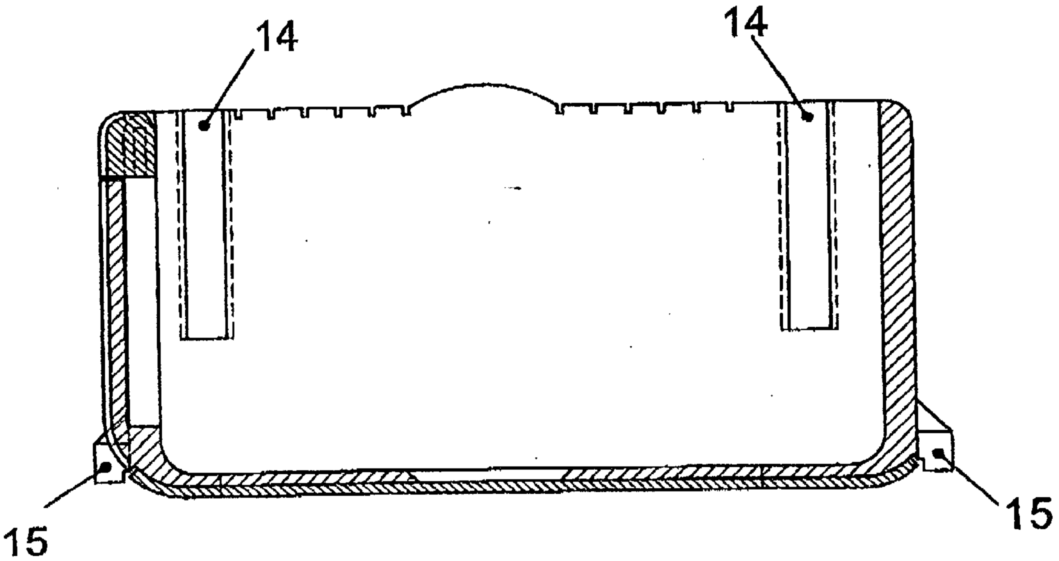
FIG. 6 shows a sectional side view of the guard/base plate of the tool.
Figure 7:
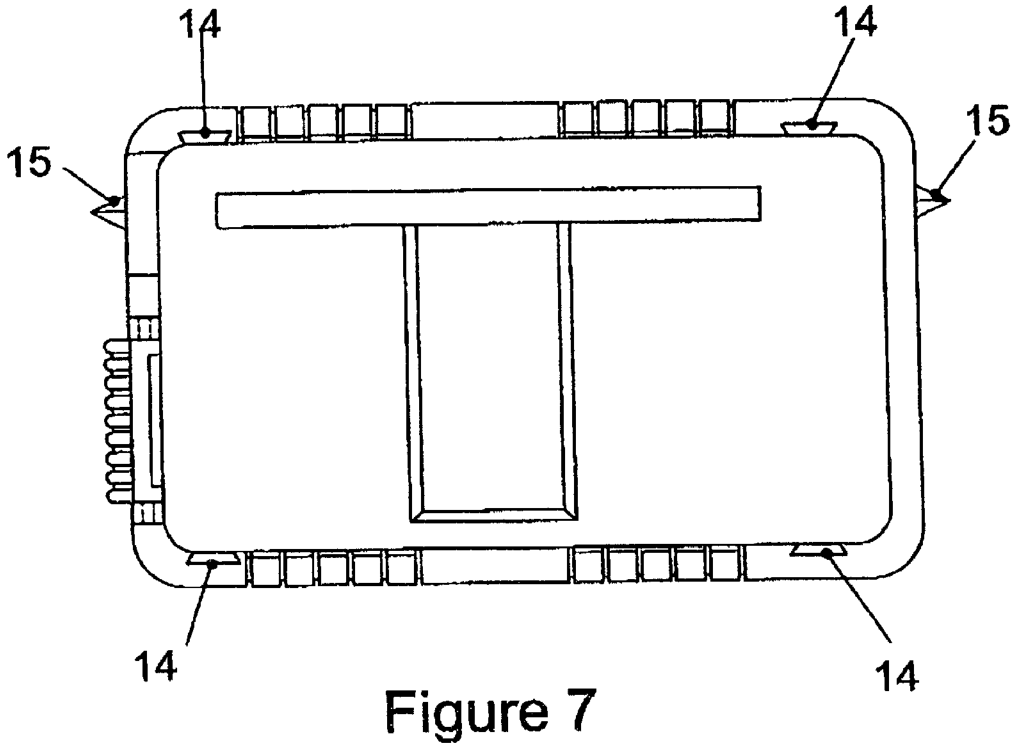
FIG. 7 shows a plan view of the guard/base plate without the sliders fitted.
Figure 8:
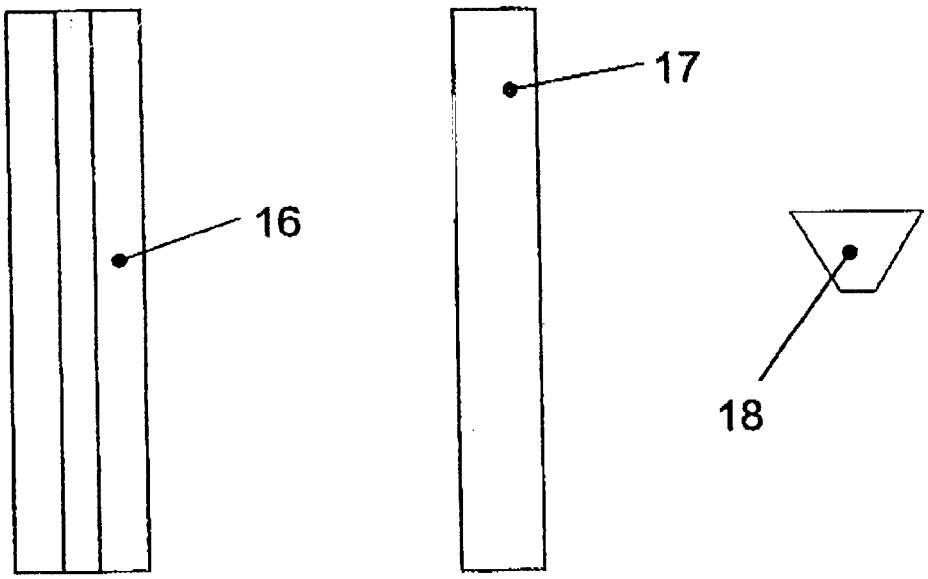
FIG. 8 shows a slider from three different views.
Figure 9:
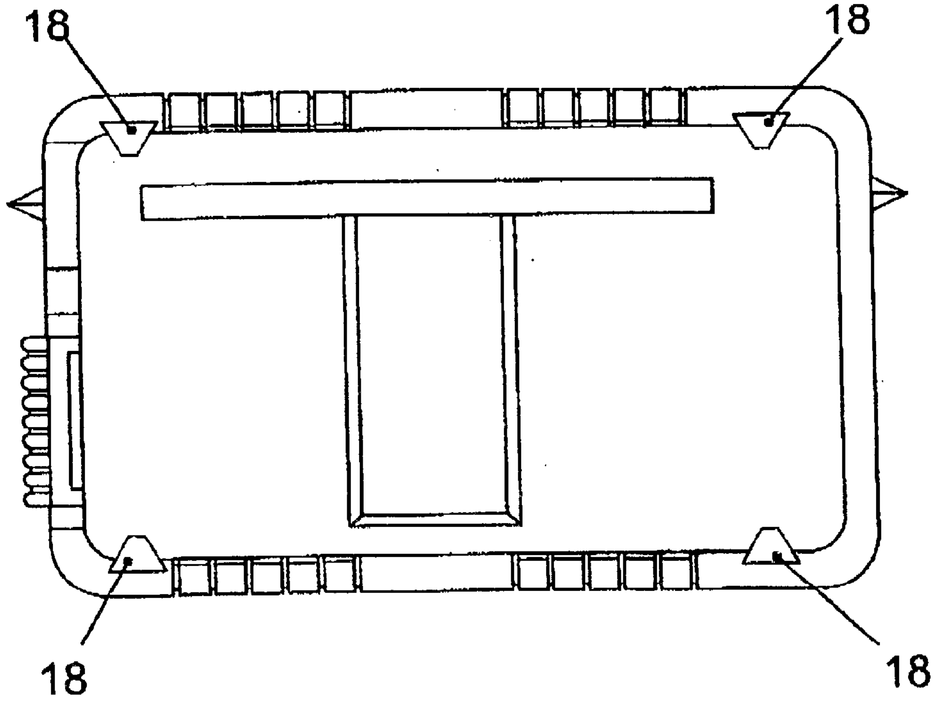
FIG. 9 shows a plan view of the guard/base plate of the tool with the sliders fitted.

The guard 10, moves with respect to the main case 5 in a direction shown by arrow 1, and in response to operator pressure. It is biased by spring 22, (as in FIG. 10) and is furthermore in a position which fully encloses blade 20. The guard 10 moves on four sliders shown in FIG. 8 (where 16 is a front view, 17 is a side view and 18 is a plan view.) The sliders are fixed in slots 14 (as in FIGS. 6 and 7) in the guard 10. They are shown in position in FIG. 9. The sliders move in grooves 9 (as in FIGS. 1 to 4.) FIGS. 3 and 4 show the main case mouldings and reveal the grooves 9 in full. FIG. 5 is a view of the main case base, indicated by arrow 13, which shows an underneath view of the grooves 9.

The depth adjuster 4, (as in FIGS. 1 and 2) acts on base plate 8 to restrict the travel of guard 10, which consequently limits the exposure of blade 20 (as in FIG. 10.) A scale 21, is provided to enable the depth to be set to a known value. Indication marks 12, (as in FIGS. 1 and 2) show the chord length of the exposed blade. The line of cut is indicated, both behind and in front of the cut, by pointers 15 (as in FIGS. 6 and 7.)

An advantage of the present, invention is that the contact between the bearings and the sliding members is not limited to a specific perpendicular height from the plane of the base plate. Such limited contact would increase the chances of jamming. Instead the contact is maintained over a range of heights, perpendicular to the base plate. In the prior art, the fit between the bearings and the grooves has to be more accurate due to the shorter the length of contact in order to prevent jamming and maintain the handle angle precision during operation.

Thus, base plate location is improved in comparison to the abovementioned prior art as the base plate is easily held in place without the risk of sticking or wobbling, achieving increased safety for the user.

A further advantage of the present invention is that as two existing ridged members of the power tool can be used as the housing grooves, therefore construction is cheaper and easier.

Figure 11:
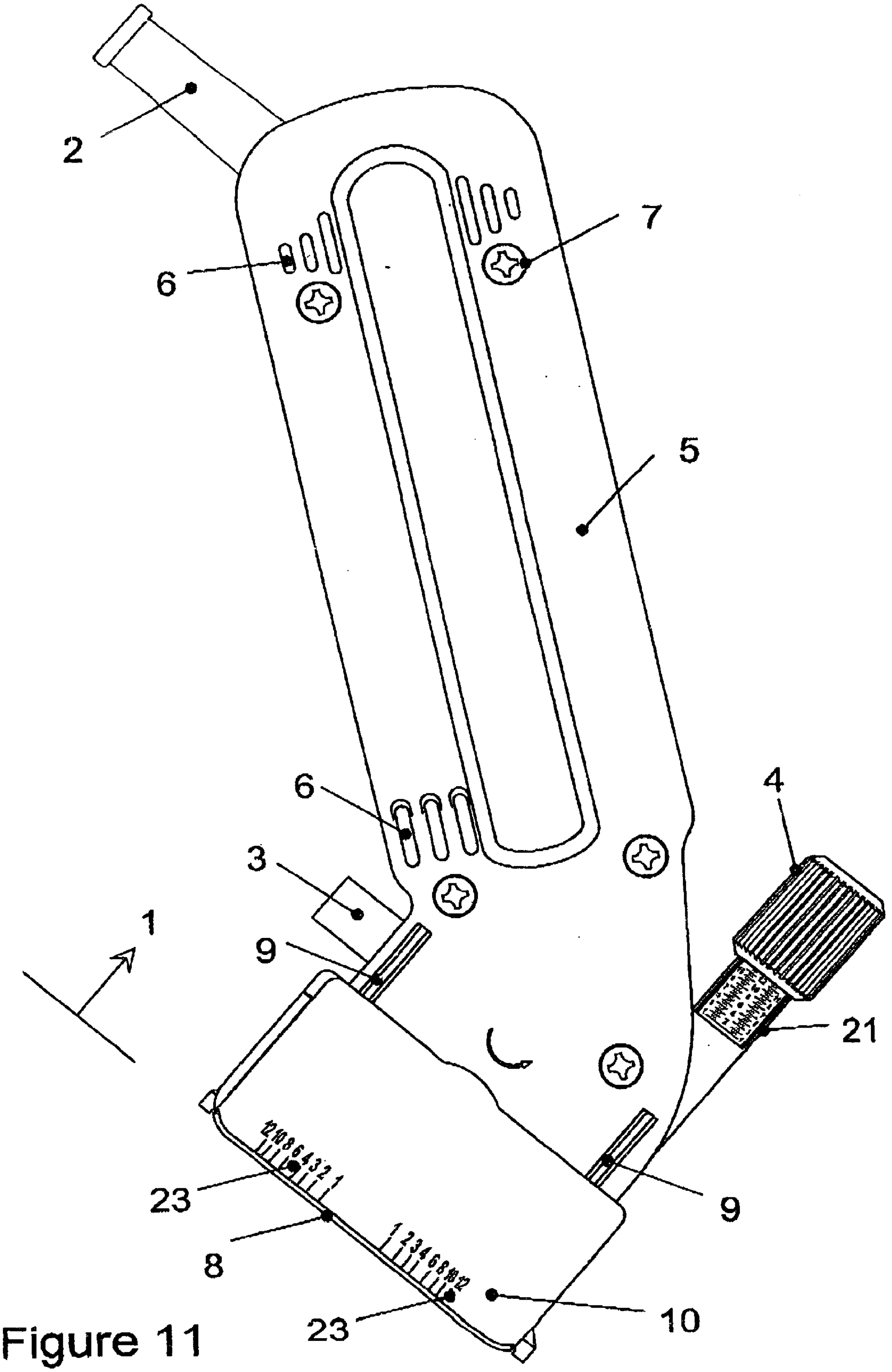
FIG. 11 shows a right hand view of the complete tool with improved blade width indication.
Figure 12:
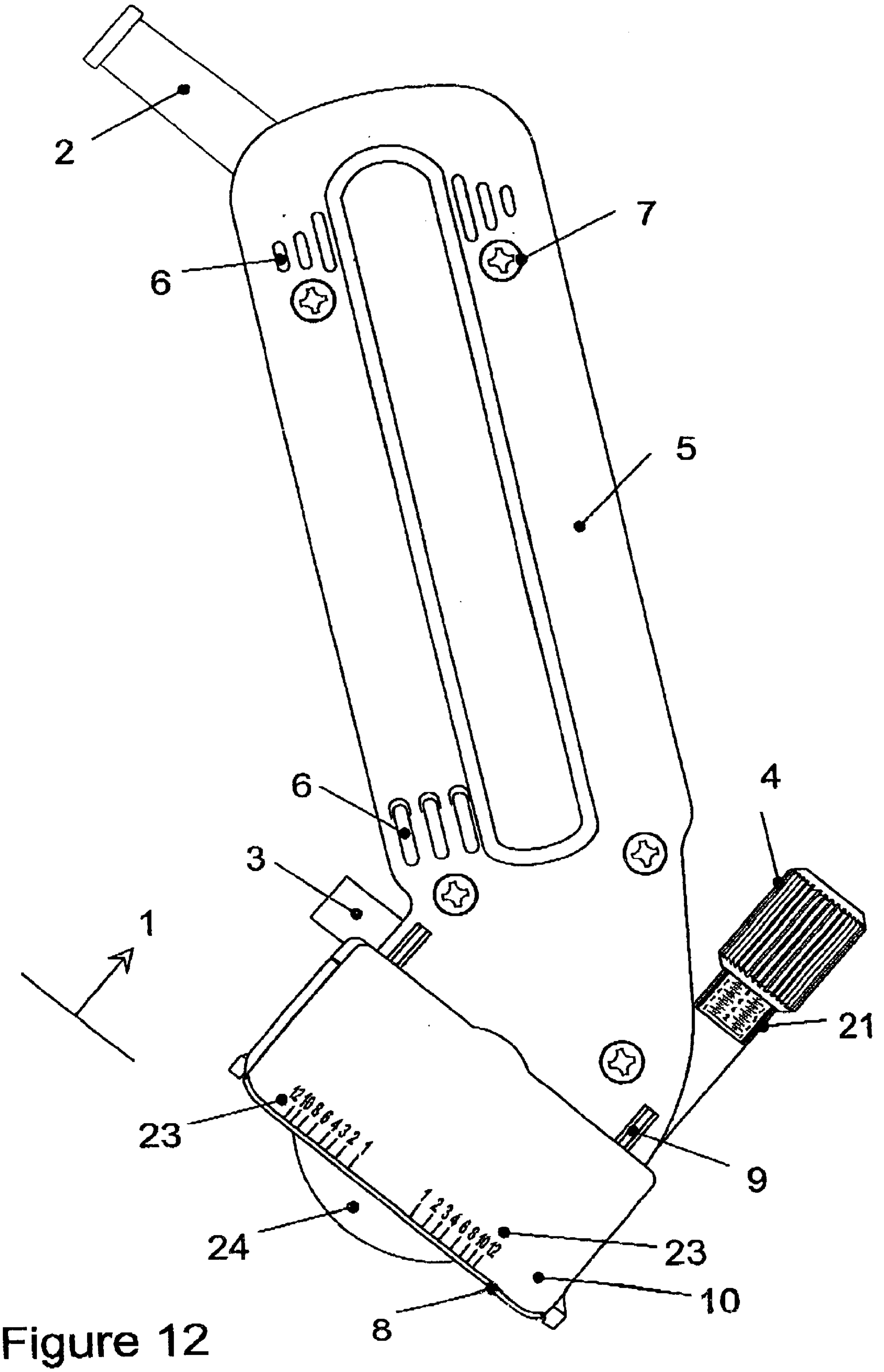
FIG. 12 shows a right hand view of the complete tool with improved blade width indication, with the guard depressed.

With reference to FIGS. 11 and 12, an embodiment of the second aspect of the invention will now be described.

Improved indication marks 23 (FIGS. 11 and 12) are marked with the same numbers as the depth scale 21. The point at which the cutting blade 24, enters and leaves the work piece, whilst cutting, will be shown by the number on scale 23, front and rear, which is the same number that is indicated on depth scale 21, by depth adjuster knob 4. The example in FIG. 12 shows the depth adjuster knob 4, set to give a cutting depth of 8 mm, which is indicated on depth scale 21. The guard 10, has been depressed to the limit set by the depth adjuster exposing cutting blade 24. The indication marks 23 show that the cutting blade enters and leaves the base plate 8, and thus the work piece at the number 8, both front and rear.

The advantage of the improved marking is that the point where the cutting blade will enter and leave the work piece can be seen before the cutting blade has been plunged into the work piece, as well as when the tool is depressed. Thus the tool can be positioned accurately for making cut outs.

An embodiment according to the third aspect of the invention is now described with reference to FIGS. 13 to 15.

Figure 13:
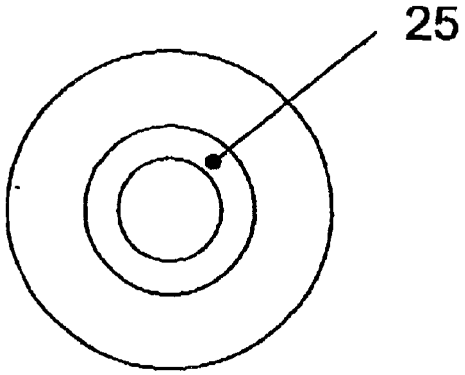
FIG. 13 shows a plan view of a safety blade retaining washer.
Figure 14:
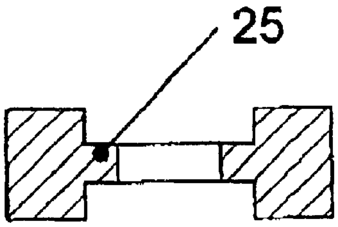
FIG. 14 shows a sectional side view of a safety blade retaining washer.
Figure 15:
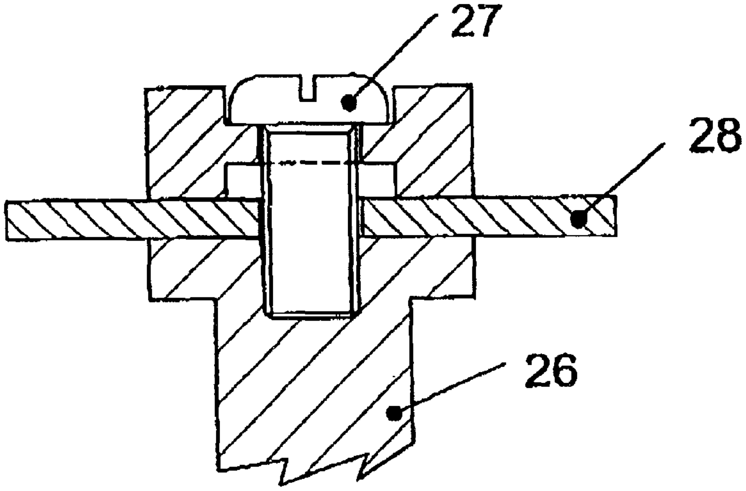
FIG. 15 shows a sectional side view of a safety blade retaining washer assembled with a blade retaining screw and a sectional side view of the cutting blade and driving shaft.

FIG. 13 shows a plan view of one version of a safety blade retaining washer and FIG. 14 shows a sectional side view. The inner section 25 is thinner than the outer rim. FIG. 15 shows an assembly in which the blade retaining screw 27 clamps the cutting blade 28, to the driving shaft 26, using the safety blade retaining washer.

If the blade stops whilst the driving shaft 26 is still turning the blade retaining screw 27 will tighten in the driving shaft 26. This results in breaking of the thinned inner section 25 of the blade retaining washer, thus releasing the blade from the driving shaft.

The blade retaining washer is made from a brittle material, such as die cast zinc, to ensure a clean break. The main case 5, which surrounds the upper part of the cutting blade 24, and the guard 10, prevents the cutting blade from exposure to the operator when the safety blade retaining washer has broken.

The thinned section 25, of the safety blade retaining washer is thinned on both sides symmetrically so that it may be fitted either way round.

The advantages of using a safety blade retaining washer is improved safety and tool reliability. In particular, the release of the cutting blade from the driving shaft reduces wear and tear on the gearbox.

It will be evident that the use of the retaining washer as in the third aspect of the invention is not limited to the type of tool specifically illustrated in the described embodiments. The washer may be applicable to any tool with a rotary cutting blade, such as a saw, a planer and a lawnmower if desired.

The safety features of the first, second and third aspects of the invention may be combined on a single tool in order to improve the reliability and safety of the tool further.

Further modifications and improvements may be added without departing from the scope of the invention herein intended.

What is claimed is:

1. A guard for use with a hand operated power tool, said guard being dimensioned to fit over and around the operating head of said power tool and being a sliding fit thereon, said guard being movable relative to said tool between a first position in which a cutting blade of the tool is covered, and a second position in which the cutting blade is exposed, wherein the guard is provided with indication marks for indicating to a user while the guard is in its second position the foremost point at which the cutting blade protrudes from the guard, the indication marks on the guard corresponding directly to an indicator scale on a depth adjuster of said power tool.

2. A guard as claimed in claim 1, wherein said guard extends around the entire perimeter of said operating head.

3. A guard as claimed in claim 1, wherein the depth adjuster controls the maximum extension of the cutting blade from a base plate of the guard.

4. A guard as claimed in claim 3, wherein the indicator scale on the depth adjuster enables the depth of the guard to be set to a known value.

5. A guard as claimed in claim 1, wherein the indication marks on the guard additionally indicate the rearmost point at which the cutting blade protrudes.

6. A hand tool assembly comprising:

a hand tool; and the guard as recited in claim 1 mounted on the hand tool.

7. A guard for use with hand operated power tools, said guard comprising a base plate and being dimensioned to fit over and around an operating head of said power tool and being a sliding fit thereon, wherein slider bearings are mounted between the guard and said operating head of the tool so as to maintain alignment between the guard and the operating head over the operating range of movement of the guard, wherein the slider bearings are grooves adapted to receive sliders, and the sliders move in the grooves whilst contacting the grooves over a range of distances from the base plate.

8. A guard as claimed in claim 7, wherein four such slider bearings are provided spaced around the periphery of the guard.

9. A guard as claimed in claim 7, wherein the slider bearings comprise co-operating tongue and groove formations on the guard and the operating head or vice versa.

10. A guard as claimed in claim 7, wherein the slider bearings are coated with a material with a relatively low co-efficient of friction.

11. A guard as claimed in claim 10, wherein the material with a relatively low co-efficient of friction is one of PTFE, polyacetal or polyamide.

12. A guard as claimed in claim 7, wherein the slider bearings are made of a material with a relatively low co-efficient of friction.

13. A guard as claimed in claim 7, wherein the guard is resiliently biased towards a first position in which a cutting blade of the tool is covered.

14. A guard as claimed in claim 7, wherein the guard features a position indicator scale and a depth adjuster to enable the depth of the guard to be set to a known value.

15. A guard as claimed in claim 7, wherein indication markings are provided to show the chord length of a blade of the power tool.

16. A guard as claimed in claim 7, wherein said guard extends around the entire perimeter of said operating head.

17. A hand tool assembly comprising:

a hand tool; and the guard as recited in claim 7 mounted on the hand tool.

18. A hand operated power tool comprising a rotary cutting blade, a driving shaft, and a retaining washer, said cutting blade being held urged towards the driving shaft by said retaining washer so that the blade and shaft rotate together, wherein the retaining washer is frangible and substantial restriction of the rotation of the cutting blade causes the retaining washer to break, thereby releasing the ,blade from being urged towards the driving shaft.

19. A hand operated power tool as claimed in claim 18, wherein the retaining washer is attached to the driving shaft by a screw extending through a hole in the retaining washer and the cutting blade.

20. A hand operated power tool as claimed in claim 19, wherein a substantial restriction of the rotation of the cutting blade causes a tightening of the screw in the driving shaft, said tightening causing the retaining washer to break.

21. A hand operated power tool as claimed in claim 18, wherein the retaining washer comprises an outer region of a first thickness, and an inner region of a second thickness, the second thickness being less than the first thickness.

22. A hand operated power tool as claimed in claim 21, wherein a fixing screw abuts the inner region, and the outer region abuts the cutting blade.

23. A hand operated power tool as claimed in claim 18, wherein the retaining washer is made from a brittle material.

24. A hand operated power tool as claimed in claim 23, wherein the brittle material is die cast zinc.

* * * * *

UNITED STATES PATENT AND TRADEMARK OFFICE

CERTIFICATE OF CORRECTION

PATENT NO. : 6,757,982 B2 
DATED : July 6, 2004
INVENTOR(S) : Neil Refson

It is certified that error appears in the above-identified patent and that said Letters Patent is hereby corrected as shown below:

<u>Column 1,</u>
Line 61, after “power tools with” insert -- a --

<u>Column 2,</u>
Line 27, after “cutting out as” change “is” to -- it --

<u>Column 4,</u>
Line 4, after “The arrow 1 in FIGS.” change “1,2 and 7” to -- 1,2,10,11 and 12 --
Line 33, change “present, invention” to -- present invention --
Line 47, after “the present invention is that” remove “as”

Signed and Sealed this

First Day of March, 2005

JON W. DUDAS
*Director of the United States Patent and Trademark Office*